US009171111B1

(12) United States Patent
Elmufdi et al.

(10) Patent No.: US 9,171,111 B1
(45) Date of Patent: Oct. 27, 2015

(54) HARDWARE EMULATION METHOD AND SYSTEM USING A PORT TIME SHIFT REGISTER

(71) Applicant: Cadence Design Systems, Inc., San Jose, CA (US)

(72) Inventors: Beshara Elmufdi, San Jose, CA (US); Mitchell G. Poplack, San Jose, CA (US); Viktor Salitrennik, Berkeley, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/500,913

(22) Filed: Sep. 29, 2014

(51) Int. Cl.
*G06F 17/50* (2006.01)

(52) U.S. Cl.
CPC ........ *G06F 17/5027* (2013.01); *G06F 2217/68* (2013.01); *G06F 2217/86* (2013.01)

(58) Field of Classification Search
CPC ............ G06F 17/5027; G06F 2217/68; G06F 2217/86
See application file for complete search history.

(56) References Cited

U.S. PATENT DOCUMENTS

| 5,680,583 | A | * | 10/1997 | Kuijsten | 703/23 |
| 7,865,346 | B2 | * | 1/2011 | Gunther et al. | 703/13 |
| 8,418,106 | B2 | * | 4/2013 | Baumgartner et al. | 716/113 |
| 8,468,404 | B1 | * | 6/2013 | Chickermane et al. | 714/729 |
| 8,549,367 | B1 | * | 10/2013 | Sherred | 714/718 |
| 8,601,415 | B2 | * | 12/2013 | Moffitt | 716/106 |
| 9,015,026 | B2 | * | 4/2015 | Poplack | 703/23 |
| 2002/0152060 | A1 | * | 10/2002 | Tseng | 703/17 |
| 2003/0237074 | A1 | * | 12/2003 | Kwon | 717/124 |

* cited by examiner

*Primary Examiner* — Naum B Levin
(74) *Attorney, Agent, or Firm* — Kaye Scholer, LLP (57) ABSTRACT

A processor-based hardware functional verification system with time shift registers is described. The system includes a processor cluster with a plurality of processors that each have a data inputs and select inputs. Furthermore, a plurality of electronic memories each having a plurality of read ports is associated with the processors, respectively. The time shift registers each have an input in communication with the read ports of the electronic memories and an output in communication with the select inputs of the processors. The system further includes an instruction memory that provides a control signal to each of the time shift registers to store data output from read ports of the electronic memories that can be provided to the processor for evaluation during a subsequent emulation step.

18 Claims, 5 Drawing Sheets

HARDWARE EMULATION METHOD AND SYSTEM USING A PORT TIME SHIFT REGISTER

FIELD

The present patent document relates generally to verifying the functionality of integrated circuit designs prior to fabrication. In particular, the present patent document relates to a method and apparatus for a hardware emulation unit having a port time shift register.

BACKGROUND

Integrated circuit designs, such as those for modern system-on-a-chip ("SOC") devices, continue to grow is size and complexity. Shrinking transistor sizes mean that more and more transistors can be included in a circuit design once fabricated as an integrated circuit chip ("chip"), while a greater number of features or components can be packed on the chip. The chip may be any type of fabricated integrated circuit, whether on a single substrate or multiple interconnected substrates. Functional verification of such devices is usually included as part of the circuit design flow to help ensure that the fabricated device functions as intended.

The increasing size and complexity of the circuit designs to be verified (devices under test, "DUT," also known as designs under verification, "DUV") mean that the functional verification portion of the design cycle is increasing in length. The verification stage may in some case be the longest stage of the design cycle. For example, running a simulation on a host computer to verify a SOC, or even a sub-portion of the SOC, written in the register transfer language ("RTL") design abstraction may take anywhere from hours to days. Certain hardware functional verification systems may leverage high-performance hardware to increase the speed of the verification stage, including a plurality of interconnected processor chips. Such systems are also referred to as "hardware emulators" herein.

Hardware emulators are programmable devices used in the verification of hardware designs. A common method of hardware design verification uses processor-based hardware emulators to emulate the DUT. These processor-based emulators sequentially evaluate combinatorial logic levels, starting at the inputs and proceeding to the outputs. Each pass through the entire set of logic levels is known as a cycle; the evaluation of each individual logic level is known as an emulation step.

A hardware emulator generally utilizes a computer workstation for providing emulation support facilities, i.e., emulation software, a compiler, and a graphical user interface to allow a person to program the emulator, and an emulation engine for performing the emulation. The emulation engine is comprised of at least one emulation board, and each emulation board contains individual emulation circuits. Each individual emulation circuit for a processor-based emulator contains multiple emulation processors, and each emulation processor is capable of mimicking a logic gate in each emulation step.

Emulation processor can be connected to data arrays, which are a special memory that has multiple read ports and supplies input data to the emulation processors. The emulation processors evaluate the data in accordance with an instruction word supplied from an instruction memory. One current design limitation of hardware emulators is that the input data provided on the read ports of the data array are not always used by the processor during an emulation step. A related limitation of hardware emulators is that there are other times when the processor has additional availability for a data input during an emulation step, but there are too few data array output ports to provide data to the available processor. Both limitations unnecessarily use up processor bandwidth during an emulation cycle. Furthermore, it is well known that processor bandwidth is a significant limiting factor of hardware emulator performance.

SUMMARY

Accordingly, a system and method is disclosed to time-shift a memory port in a processor-based hardware functional verification system. The system includes a processor cluster with a plurality of processors that each have a data inputs and select inputs. Furthermore, a plurality of electronic memories each having a plurality of read ports is associated with the processors, respectively. The time shift registers each have an input in communication with the read ports of the electronic memories and an output in communication with the select inputs of the processors. The system further includes an instruction memory that provides a control signal to each of the time shift registers to store data output from read ports of the electronic memories that can be provided to the processor for evaluation during an emulation step.

According to an embodiment, a processor-based hardware functional verification system into which a circuit design may be mapped is provided in which the system includes a plurality of processors, each processor having a plurality of data inputs and a plurality of select inputs; a plurality of electronic memories, each electronic memory having a plurality of read ports; a plurality of time shift registers, each time shift register having an input communicatively coupled to the plurality of read ports of the plurality of electronic memories, and an output communicatively coupled to the plurality of select inputs of one of the plurality of processors, respectively; and an instruction memory configured to provide a first control signal to at least one of the plurality of time shift registers to store a first amount of data output from one of the plurality of read ports of the plurality of electronic memories.

According to an embodiment, the plurality of processors is communicatively coupled to each of the plurality of electronic memories, respectively, with the plurality of select inputs respectively coupled to the plurality of read ports of the plurality of electronic memories.

According to an embodiment, the instruction memory is further configured to provide instruction words to the plurality of data inputs of the plurality of processors.

According to an embodiment, the instruction memory is further configured to provide a second control signal to the at least one of the plurality of time shift registers to output the first amount of data via the output.

According to an embodiment, the system further includes a plurality of multiplexers configured to route the first amount of data output by the at least one time shift register to one of the plurality of select inputs of one of the plurality of processors based on a plurality of control signals provided by the instruction memory to the plurality of multiplexers, respectively.

According to an embodiment, the instruction memory is further configured to provide a third control signal to the one of the plurality of processors to perform a Boolean function using the first amount of data.

According to an embodiment, the system further includes a plurality of multiplexers configured to route the first amount of data from one of the plurality of read ports of the plurality of electronic memories to one of the plurality of time shift registers based on a plurality of control signals provided by the instruction memory to the plurality of multiplexers, respectively.

According to an embodiment, an emulation chip is provided into which a portion of a circuit design may be mapped during functional verification. The emulation chip includes at least one processor having a plurality of data inputs and a plurality of select inputs; at least one electronic memory having a plurality of read ports; at least one time shift register having an input communicatively coupled to the plurality of read ports and an output communicatively coupled to the plurality of select inputs; and an instruction memory configured to provide a first control signal to the at least one time shift registers to store a first amount of data output from one of the plurality of read ports.

According to an embodiment, the at least one processors is communicatively coupled to the at least one electronic memory, respectively, with the plurality of select inputs respectively coupled to the plurality of read ports.

According to an embodiment, the instruction memory is further configured to provide instruction words to the plurality of data inputs of the at least one processor.

According to an embodiment, the instruction memory is further configured to provide a second control signal to the at least one time shift register to output the first amount of data via the output.

According to an embodiment, the chip further includes a plurality of multiplexers configured to route the first amount of data output by the at least one time shift register to one of the plurality of select inputs of the at least one processor based on a plurality of control signals provided by the instruction memory to the plurality of multiplexers, respectively.

According to an embodiment, the instruction memory is further configured to provide a third control signal to the at least one processor to perform a Boolean function using the first amount of data.

According to an embodiment, the chip further includes a plurality of multiplexers configured to route the first amount of data from one of the plurality of read ports of the at least one electronic memory to the at least one time shift register based on a plurality of control signals provided by the instruction memory to the plurality of multiplexers, respectively.

According to an embodiment, a method is provided for performing a lookup table operation during an emulations step using a time shift register. The method includes identifying at least one read port of a array memory in a processor cluster that is not being used by a processor during a first emulation step; storing a first amount of data on the at least one read port in the time shift register; providing the first amount of data from the at least one read port in the time shift register to a select input of the processor during a second emulation step; and performing a Boolean function by the processor using the first amount of data.

According to an embodiment, the method further includes storing a result of the Boolean function in the array memory.

According to an embodiment, the method further includes routing the first amount of data from the at least one read port of the array memory to the at least one time shift register by a plurality of multiplexers controlled by a plurality of respective control signals provided by an instruction memory.

According to an embodiment, the method further includes routing the first amount of data from the at least one time shift register to the select input of the processor by a plurality of multiplexers based on a plurality of respective control signals provided by an instruction memory.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and apparatus using one or more port time shift registers in a processor-based hardware functional verification system is disclosed herein. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates acid transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Typical functional verification systems, including hardware emulation systems and simulation acceleration systems, utilize either interconnected programmable logic chips or interconnected processor chips. Examples of systems using programmable logic devices are disclosed in, for example, U.S. Pat. No. 6,009,256 entitled "Simulation/Emulation System and Method," U.S. Pat. No. 5,109,353 entitled "Apparatus for emulation of electronic hardware system," U.S. Pat. No. 5,036,473 entitled "Method of using electronically reconfigurable logic circuits," U.S. Pat. No. 5,475,830 entitled "Structure and method for providing a reconfigurable emulation circuit without hold time violations," and U.S. Pat. No. 5,960,191 entitled "Emulation system with time-multiplexed interconnect." U.S. Pat. Nos. 6,009,256, 5,109,353, 5,036,473, 5,475,830, and 5,960,191 are each incorporated herein by reference. Examples of hardware logic emulation systems using processor chips are disclosed in, for example, U.S. Pat. No. 6,618,698 "Clustered processors in an emulation engine," U.S. Pat. No. 5,551,013 entitled "Multiprocessor for hardware emulation," U.S. Pat. No. 6,035,117 entitled "Tightly coupled emulation processors," and U.S. Pat. No. 6,051,030 entitled "Emulation module having planar array organization," U.S. Pat. Nos. 6,618,698, 5,551,013, 6,035,117, and 6,051,030 are each incorporated herein by reference.

Figure 1:
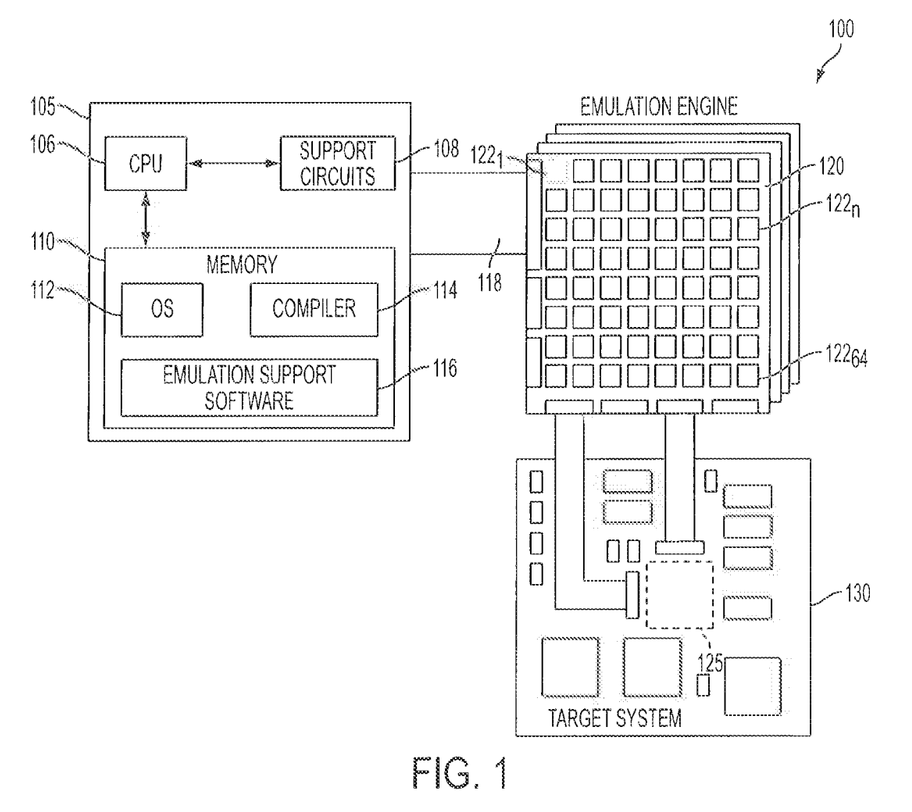
FIG. 1 illustrate an overview of a processor-based emulation system according to an exemplary embodiment.

FIG. 1 illustrate an overview of a processor-based emulation system 100 according to an exemplary embodiment. The system comprises a host or computer workstation 105, an emulation engine including emulation board 120, and a target system 130. It should be appreciated that while a processor-based emulation engine is described in the exemplary embodiment, other emulation engines, such as those utilizing arrays of programmable logic devices (such as FPGAs) may also be used, for example properly-configured versions of the systems discussed above.

The host workstation 105 provides emulation support facilities to the emulation engine 100 and emulation board 120. The host workstation 105, for example a personal computer, comprises at least one central processing unit (CPU) 106, support circuits 108, and a memory 110. The CPU 106 may comprise one or more conventionally available microprocessors and/or microcontrollers. The support circuits 108 are well known circuits that are used to support the operation of the CPU 106. These supporting circuits comprise power supplies, clocks, input/output interface circuitry, cache, and other similar circuits.

Memory 110, sometimes referred to as main memory, may comprise random access memory, read only memory, disk memory, flash memory, optical storage, and/or various combinations of these types of memory. Memory 110 may in part be used as cache memory or buffer memory. Memory 110 stores various forms of software and files for the emulation system, such as an operating system (OS) 112, a compiler 114, and emulation support software 116.

The compiler 114 converts a hardware design, such as hardware described in VHSIC hardware Description Language (VHDL) or Verilog, to a sequence of instructions that can be evaluated by the emulation board 120.

The host workstation 105 allows a user to interface with the emulation engine 100 via communications channel 118, including emulation board 120, and control the emulation process and collect emulation results for analysis. Under control of the host workstation 105, programming information and data is loaded to the emulation engine 100. The emulation board 120 has on it a number of individual emulation chips, for example the 64 emulation chips $122_1$ to $122_{64}$ (collectively labeled as 122) shown in FIG. 1, in addition to miscellaneous support circuitry. Each emulation chip contains multiple emulation processors and each emulation processor is capable of mimicking a logic gate in each emulation step.

In response to programming received from the emulation support software 116, emulation engine 100 emulates a portion 125 of the target system 130. Portion 125 of the target system 130 may be an integrated circuit, a memory, a processor, or any other object or device that may be emulated in a programming language. Exemplary emulation programming languages include Verilog and VHDL as noted above.

Figure 2:
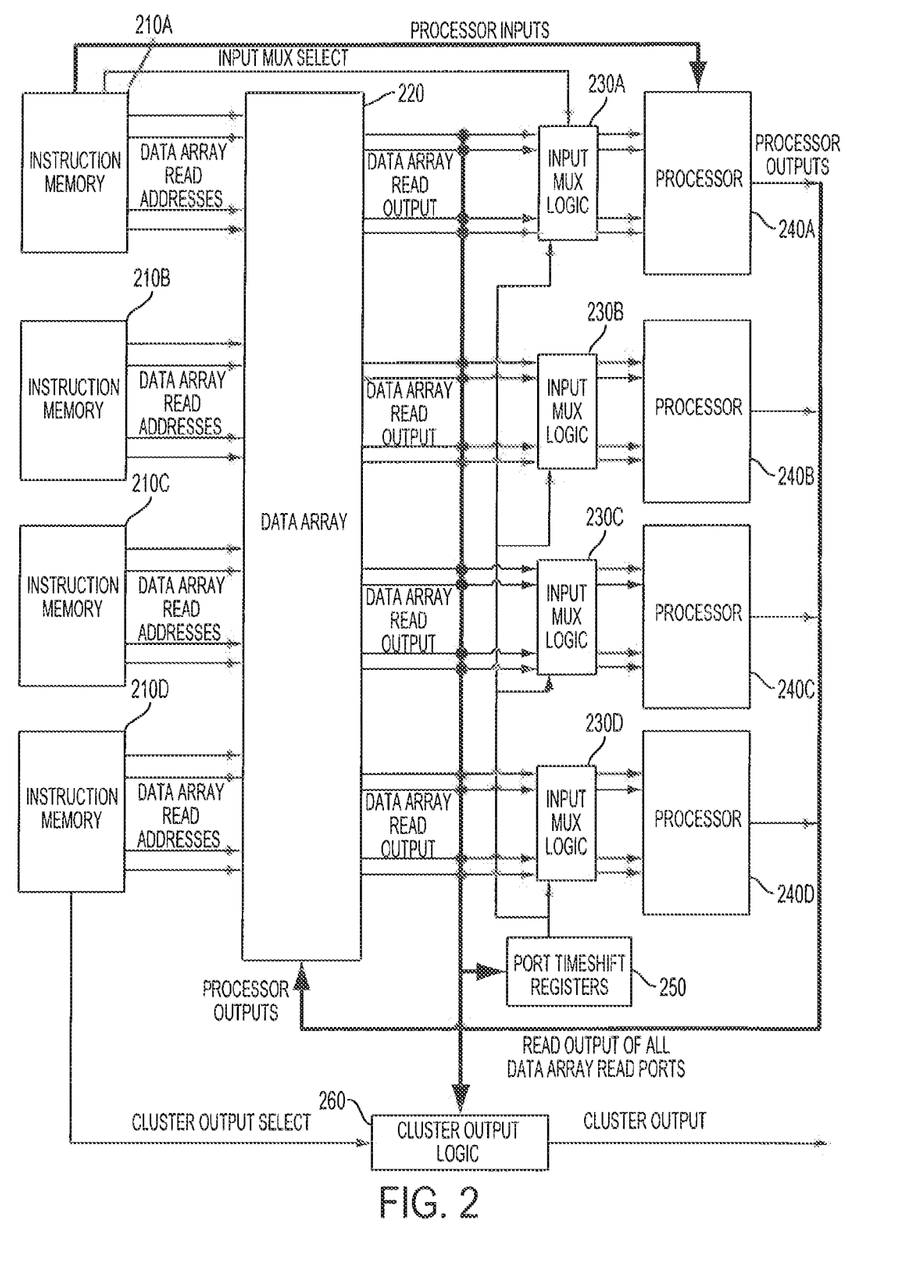
FIG. 2 illustrates a processor cluster within the processor-based emulation system of FIG. 1 according to an exemplary embodiment.

FIG. 2 illustrates a processor cluster 200, which is a collection of emulation processors and other circuitry of an emulation chip 122n within the processor-based emulation system 100 described above with respect to FIG. 1. According to an exemplary embodiment, processor cluster 200 comprises eight emulation processors, although FIG. 2 only illustrates four emulation processors 240A-240D for clarity of the illustration. It should be readily apparent that four additional processors can be included in the processor cluster 200 using a similar configuration and circuit as shown in FIG. 2. Furthermore, in an alternative embodiment, the processor can include more than or less than eight processors.

The processors 240A-240D of the processor cluster 200 are the basis of the emulation chip 122n. The processors 240A-240D will be described in detail below, but, generally, each processor is provided to evaluate four input functions in the emulated design. In addition, the processor cluster 200 also contains the instruction and data memories associated with the processors as well as the facilities/components needed to communicate to with other processor clusters in the emulation chip 122n, in other emulation chips of the emulation board 120, and the like.

As shown in FIG. 2, the processor cluster 200 includes six types of functional blocks that collectively perform the various functions of the processor cluster 200 to emulate the hardware design. It should be appreciated that these functional blocks are a collection of hardware and/or software components as will be described in detail below, and that FIG. 2 illustrates the design as functional blocks to clearly illustrate the overall system design and functionality. As shown, processor cluster 200 includes instruction memory blocks 210A-210D, a data array block 220, input multiplexer logic blocks 230A-230D, processor blocks 240A-240D, port time shift register block 250, and cluster output logic block 260.

The instruction memory blocks 210A-210D contains the instructions (i.e., the control store words) for the processors 240A-240D and other facilities in the processor cluster 200. The control store words (CSW) control the operation of the processors and the associated facilities, including the instructions for the data array block 220. The emulation process begins by writing an emulation program into the instruction memory blocks 210 that will control the processors during emulation when the emulation system runs the emulation program (stepping) and the processors and associated facilities (e.g., data array block 220) execute the instructions. In one embodiment, the instruction memory blocks 210A-210D also contain error checking and correction (ECC) logic to correct any single bit errors in the instructions and detect any two bit errors.

Although not shown, in one embodiment the processor cluster 200 includes a decoder block that receives the system wide instructions from the instruction memory blocks 210A-D and divides the system wide instructions into discrete instructions provided for the individual facilities, including the processors. The instruction decoder also delays any instructions that require delay until the appropriate time. Once the instruction decoder divides the system wide instructions into targeted instructions, these instructions are then sent to the other blocks in the processor cluster 200 (i.e., the individual facilities) and/or sent to other facilities outside the processor cluster 200 as would be understood to one skilled in the art. An example of the decoder is discussed below with reference to FIG. 3.

Referring back to FIG. 2, the data array block 220 contains the data array memories of the processor cluster 200. In one exemplary embodiment, the data array memories in data array block 220 can be implemented as multiple memories each with the same data so that the individual memories collectively mimic a single memory with a large number of read output ports that go to the lookup tables. Data array block 220 is shown as a single memory. The memories have multiple read output ports that are used to provide one bit each to the lookup tables to be used during emulation. As further shown, these read output ports are also coupled to cluster output logic 260 and, during an emulation step, can be used to drive a cluster output. Accordingly, for any particular emulation step, a read output port of data array block 220 can be used for either a processor input or for a cluster output. The cluster output logic 260 receives data from the read output ports of the data array block 220 and outputs cluster output data to other facilities, processor clusters, and the like. Instructions for the cluster output logic 260 are provided by the instruction memory.

In the exemplary embodiment, the data array block 220 also preferably includes controls to bypass the memories for very recent data that has yet to be stored, so that this data can be available very quickly for the lookup tables. In addition, the data array block 220 also preferably stores the data results of the evaluations of the processors during every step of the emulation and also stores the cluster inputs (same as processor inputs but there are 8 inputs per cluster).

As further shown, the read output ports of the data array block 220 are coupled to input multiplexer logic 230A-230D. In the exemplary embodiment, each input multiplexer logic block 230A-230D is associated with and communicatively coupled to a respective processor 240A-240D. The input multiplexer logic is controlled by an input multiplexer select signal provided by the instruction memory and is provided to control which select signals are input to the respective processors 240A-240D. Furthermore, each processor block 240A-240l) contains a lookup tables provided for evaluation during emulation using the data received from the data array block 220 and from the instruction memory as processor inputs. In the exemplary embodiment, each of the lookup tables has four inputs (i.e., a LUT4). However, it should be appreciated that multiple lookup tables can be combined using special configurations to be a five input lookup table (i.e., a LUT5), a six input lookup table (i.e., a LUT6), or the like. It is also contemplated that the processor cluster 200 can be configured in certain modes where the lookup tables can function as emulation registers. Yet in another embodiment, the processors further include logic to feed the result of one lookup table to the next lookup table (with limitations) within the same step, which will be referred to as "fastpath". In the exemplary embodiment, up to four lookup tables can be chained together using fastpath.

The exemplary processor cluster 200 also includes a port time shift register block 250 that includes one or more port time shift registers coupled to the processors 240A-240D. As shown, au input of the port time shift register block 250 is coupled to the read output ports of the data array block 220 and an output of the port time shift register block 250 is coupled to each of the input multiplexer logic block 230A-230D. The specific details and functionality of the port time shift registers will be discussed in detail below with respect to FIG. 4.

As described above, each of the blocks/facilities of processor cluster 200 are primarily controlled by the instructions loaded in instruction memory blocks 210A-210D. However, there are other components also used to configure and control the processor cluster 200. Although not shown in FIG. 2, the processor cluster 200 can include additional communication buses, such as a system bus and a step control bus. The system bus is a global bus in the processor cluster 200 that provides access to all the major facilities of the chip and is provided to write the instructions to the instruction memory blocks 210A-210D. The step control bus is provided to control the execution of the emulation program (i.e., the reading and execution of the instructions in the instruction memory blocks 210A-210D). The step control bus provides the current read addresses to the instruction memory blocks 210A-210D and the current write addresses to the data array block 220.

Figure 3:
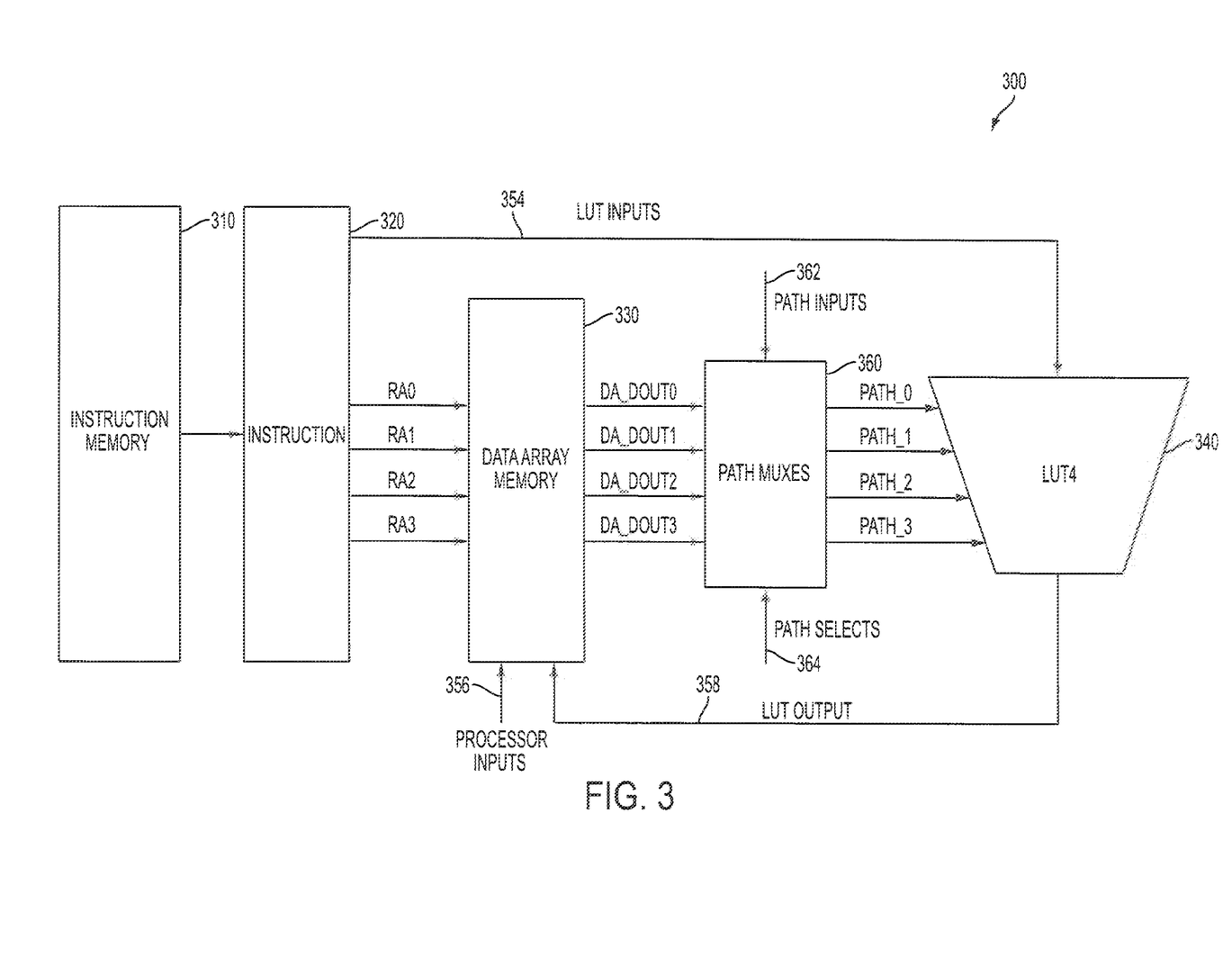
FIG. 3 illustrates a detailed block diagram of an emulation processor of the processor cluster of FIG. 2 according to an exemplary embodiment.

FIG. 3 illustrates a detailed block diagram of an emulation processor 300 and its connection to certain facilities of the processor cluster 200 illustrated in FIG. 2. In particular, FIG. 3 illustrates an instruction memory 310, decoder 320, data array memory 330, path multiplexers 360, and lookup table (LUT) 340. As should be appreciated, instruction memory 310 and data array memory 330 generally correspond to instruction memory block 210 and data array memory block 220 shown in FIG. 2.

As described above, the processor blocks of the processor cluster 200 generally correspond to individual processors (i.e., eight processors in the exemplary embodiment). FIG. 3 illustrates one of the individual emulation processors 300 according to the exemplary embodiment. As shown, the lookup table 340 is a multiplexer that is provided to execute any Boolean function that has the same number of inputs as the number of select inputs of the multiplexer and to output a single bit result known as a function bit out (FBO). For example, a 4-way multiplexer has two select inputs and four data inputs. By varying the values of the data inputs, any 2-bit Boolean function can be emulated using the multiplexer. The processor cluster 200 uses 4-input lookup tables for each emulation processor 300 in accordance with the exemplary embodiment. Accordingly, these 4-input lookup tables can perform any 4-bit Boolean function as the basis of its processors. The lookup table 340 evaluates data received from the data array memory 330 using a control store word (CSW) supplied from the instruction memory 310 to produce the FBO. The resulting FBO can correspond to any one of a logic gate output of the emulated design, a register output of the emulated design, a synthesized intermediate logic state, or a control bit generated for the emulation process.

The instruction memory 310 contains the instructions (i.e., control store words) for the lookup table 340 in the processor cluster, which are passed to the lookup table 340 from the decoder 320 as LUT inputs 354. In particular, emulation of a chip design is achieved by repeatedly running a set of these instructions. Each pass through the instruction memory 310 (i.e., a cycle) results in the equivalent number of lookup table operations. Using the depth of the instruction memory 310 and multiplying this by the size of the lookup table (e.g., a 4-input lookup table) results in the overall capacity of the system. Accordingly, if the instruction memory 310 has eight locations, one cycle would result in the emulation processor 300 executing eight lookup table 340 operations.

As shown in FIG. 2, the data array block 220 contains the data memory of the processor cluster 200 and is implemented as multiple memories in the exemplary embodiment. Data array memory 330 corresponds to an individual array memory associated with each emulation processor 300 of the eight processors of the exemplary processor cluster. In the exemplary embodiment, each data array memory 330 is a static random access memory (SRAM) that is provided to store the results of lookup table evaluations (i.e., the LUT output 358) during emulation and inputs to the processor block. In the exemplary embodiment, the data array memory 300 has a number of single bit read ports that is equal to the number of select inputs of the processor (i.e., four select inputs for the lookup table 340) and one wide write port to write the result of the lookup table evaluations and the processor inputs. The data array memory 330 stores a number of steps (i.e., one step is one clock cycle and the number of steps per cycle program depth) of the lookup evaluation outputs and the processor inputs for subsequent access after emulation to evaluate the functionality and operation of the lookup table 340. The depth of the data array memory 330 is equal to the instruction memory depth.

In general, it should be appreciated that each individual processor has a limited capacity (e.g., 1280 gates) and, therefore, would not be useful for emulation of a current multi-million gate design. As a result, the eight processors of a processor cluster work in a group. To do so, these processors communicate with each other by sending their respective lookup table evaluations to the other processors. The better the communications channel (high bandwidth and low latency), the more efficiently the processors will be used with less time wasted waiting for data from other processors. The most efficient communication channel is the data array memory 330. Thus, in the exemplary embodiment, all processors of the processor cluster share the same data memory as discussed above with respect to FIG. 2. As shown in FIG. 3, the data array memory 330 includes processor inputs 356, which are inputs from other processors in the processor cluster, and is also coupled to LUT output 358 to receive the output evaluations of the lookup table 340.

As further shown and as described above, the data array memory 330 has multiple read output ports, e.g., four read output ports (DA_DOUT0 through DA_DOUT3), that provide input data to the lookup table 340 via the path multiplexers 360. The path multiplexers 360 correspond to the input multiplexer logic blocks shown in FIG. 2 and are used to select the inputs provided to the lookup table 340 and can also be used to chain lookup table operations in a single step. As noted above, each lookup table 340 is essentially a 16-way multiplexer that receives its 16 inputs from the decoder 320 as LUT inputs 354. In addition, the 4-bit select inputs (Path__0 through Path__3) comes from the path multiplexers 360. In normal operation, these multiplexers provide the data address outputs (DA_DOUT0 through DA_DOUT3) from the four read ports of the data array memory 330 as the 4-bit select inputs of the lookup table 340. However, the path multiplexers 360 can also provide other types of inputs (i.e., path inputs 362) to the lookup table 340 to significantly improve the flexibility of the lookup tables in each of the processor blocks 240 of the processor cluster 200.

The path multiplexers 360 are configured to enable the processors in the processor cluster to receive inputs other than DA_DOUT (e.g., path inputs 362) from the respective data array memory 330 as well as for the purpose of chaining multiple function tables (FTABs) together so that they can execute in a single step. The output of the path multiplexers 360 are controlled by input signals via path selects 364. In one refinement of the exemplary embodiment, the processor clusters is configured such that when a lower index processor is fed forward to an input of higher index processors to chain multiple FTABs, data will flow forward, i.e., processor 2 can only feed processor 3, processor 1 can only feed processor 2 and processor 3, and the like. The path multiplexers 360 are also provided to feed additional types of data into the lookup table select inputs, including data from received from the port time shift register block 250.

As shown in FIG. 3, the lookup table 340 includes multiple select input ports to receive select inputs Path_0 through Path_3. As noted above, each of these select input ports can correspond to a read output port of the data array memory 330 (i.e., DA_DOUT0 through DA_DOUT3). However, during emulation, the lookup table 340 does not always require all of the input data supplied from the data array memory 330 during a particular emulation step. Moreover, one or more of the read output ports may be used during a particular emulation step to drive the cluster output logic. For example, during an emulation step the lookup table 340 may only receive data supplied from three read ports of the data array memory 330 (e.g., DA_DOUT0 through DA_DOUT2), while the data from the fourth read port (e.g., DA_DOUT3) is being used to drive the cluster output logic. As described above, the processor cluster also includes one or more port time shift registers, with one register associated with each of the lookup tables 340, respectively, in the exemplary embodiment.

The port time shift registers are provided to store output bits from the data array memory 330, such that these data array output bits can be used later as inputs for one or more of the lookup tables. As discussed above, there are times in the scheduler (i.e., the program or cycle) when there are free data array memory outputs (DA_DOUTs) and there are times when there are too few data array output ports. For example, during a specific emulation step, one or more of the data array memory outputs (DA_DOUTs) may be used to drive the cluster output logic. In these instances, the port time Shift registers are provided to fetch and store bits from the data array memories, when there are free DA_DOUTs, that can subsequently be used during an emulation step when there are not enough DA_DOUT ports, which significantly reduces wait steps over the course of an emulation program.

In the exemplary embodiment, the one or more port time shift registers are capable of storing a bit from any of the 32 DA_DOUTs (i.e., four outputs from each data array memory and eight total data array memories in a cluster). The CSW in the instruction memory blocks 310 for each processor contains the necessary bits to instruct each port time shift register to store a bit from one of the eight data array memories or to provide the stored bit as an input to the associated lookup table. There are two control signals for each register, a write control signal (PTS_WR) and a read control signal (PTS_RD). If a bit is to be stored in a given register, the instruction memory sets the PTS_WR for that register to 1 and the PTS_RD for that register to 0. Alternatively, if a bit is to be used in the current instruction, the instruction memory sets the PTS_WR for that register to 0 and the PTS_RD for that register to 1. It should be appreciated that a bit cannot be stored in the register and then output by the register during the same step and that at least one emulation step must pass before the bit can be output to a lookup table. For example, if on emulation step N, one of the emulation processor stores a bit from the data array to one of the port time shift registers, that bit cannot be used as an input to a lookup table until emulation step N+1 at the earliest.

Figure 4:
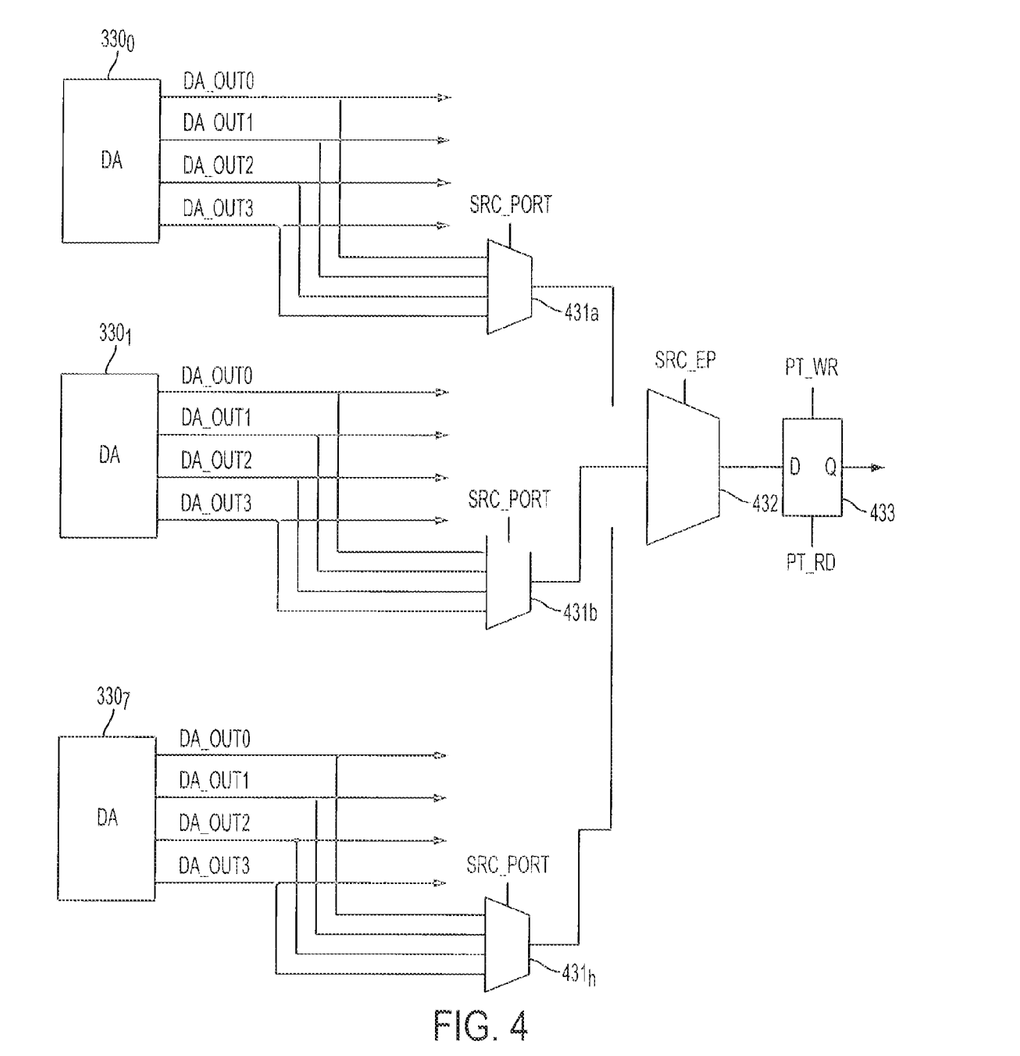
FIG. 4 illustrates an exemplary configuration of multiplexers for controlling data input to a port time shift register of the emulation processor of FIG. 3 according to an exemplary embodiment.

In the exemplary embodiment, each port time shift register can store any one of the 32 output bits (DA_DOUTs) from the eight data arrays. This is done through an additional series of multiplexers. FIG. 4 illustrates an exemplary configuration of multiplexers for controlling the input stored to a port time shift register. It should be appreciated that FIG. 4 illustrates the logic and the port time shift register(s) included in port time shifter register block 250 of FIG. 2.

In particular, FIG. 4 illustrates the eight data array memories $330_0, 330_1, \ldots 330_7$ that correspond to the eight individual data array memories associated with the respective lookup tables discussed above. As further described above, each data array memory includes four read ports (i.e., DA_DOUT0 through DA_DOUT3) that are fed to the path multiplexers 360 (not shown in FIG. 4). In addition, each of these read ports for each data array memory is coupled to a 4-input multiplexer 431a, 431b, . . . 431h, respectively. In the exemplary embodiment, a separate source port signal SRC_PORT [1:0] is fed to one or more of the 4-input multiplexer 431a, 431b, . . . 431h to indicate which of the 4 data address output values DA_DOUT0 through DA_DOUT3 from the respective data array memories $330_0, 330_1, \ldots 330_n$ should be stored in the port time shift register. As further shown, the output of each of the 4-input multiplexer 431a, 431b, . . . 431h is fed as an input to an 8-input multiplexer 432. Only three inputs are shown in FIG. 4 for clarification purposes, but the multiplexer 432 has eight inputs in accordance with the exemplary embodiment as would be understood to one skilled in the art. A separate emulation processor source signal SRC_EP [2:0] is fed to the 8-input multiplexer 432 and indicates which emulation processors data address output signal DA_DOUT should be stored in the port time shift register. The port time shift register 433 includes a data input D and data output Q. As discussed above, the PTS_WR and PTS_RD signals control whether the register 433 is in read mode or write mode. Although not shown, instruction memory 310 provides the instructions/control signals for each of the multiplexers and port time shift register illustrated in FIG. 4 and contemplated herein according to the exemplary embodiment.

It should be appreciated that FIG. 4 illustrates a single port time shift register 433. As described above, in the exemplary embodiment the processor block 240 can contain eight port time shift registers with one register for each respective lookup table, although the exemplary system described herein should in no way be so limited. In one embodiment, a demultiplexer or similar circuit is coupled to the output of the 8-input multiplexer 432 and routes the output to any one of the eight port time shift registers using the multiplexing logic discussed above with reference to FIGS. 2 and 3. Thus, the instruction memory can control which of the 8 port time shift registers stores the data from any of the 32 DA_DOUTs.

Moreover, in the exemplary embodiment, the multiplexer configuration shown in FIG. 4 is positioned between the data array memories and the path multiplexers 360 (i.e., the input multiplexer logic blocks 230A-230D of FIG. 2). In other words, the outputs Q of the port time shift registers are fed to the path multiplexers 360 in the exemplary embodiment, as path inputs 362 for example. More particularly, the output Q of each port time shift register is fed to additional multiplexers/demultiplexers or similar selection circuitry that can either be a separate facility of the processor cluster 200 or part of the path multiplexers 360. These additional multiplexers/demultiplexers determine which of the eight output values Q of the respective port time shift registers is to be used as a select input signal of one of the lookup table 340 by setting a source register signal SRC_REG (0-7). Furthermore, these additional multiplexers/demultiplexers can indicate which of the four lookup table input ports (e.g., Path_0 through Path_3 shown in FIG. 3) should be used to receive the output of the register 433 by setting a target port signal TGT_PORT (0-3).

It should be appreciated that FIG. 4 provides an exemplary configuration of multiplexers for routing any one of the 32 output bits (DA_DOUTs) from the eight data arrays to one of the port time shift registers 433. However, the specific configuration illustrated in FIG. 4 is only representative of the exemplary embodiment and other multiplexer/demultiplexer configurations can be implemented as would be understood to one skilled in the art. For example, in a refinement of the embodiment, the output of the 8-input multiplexer 432 can be fed to an 8-output demultiplexer with each of its outputs coupled to one of the respective data inputs of each port time shift register. In this instance, a target register control signal TGT_REG can control which of the eight port time shift registers the DA_DOUT signal should be fed to for storage using the demultiplexer.

Figure 5:
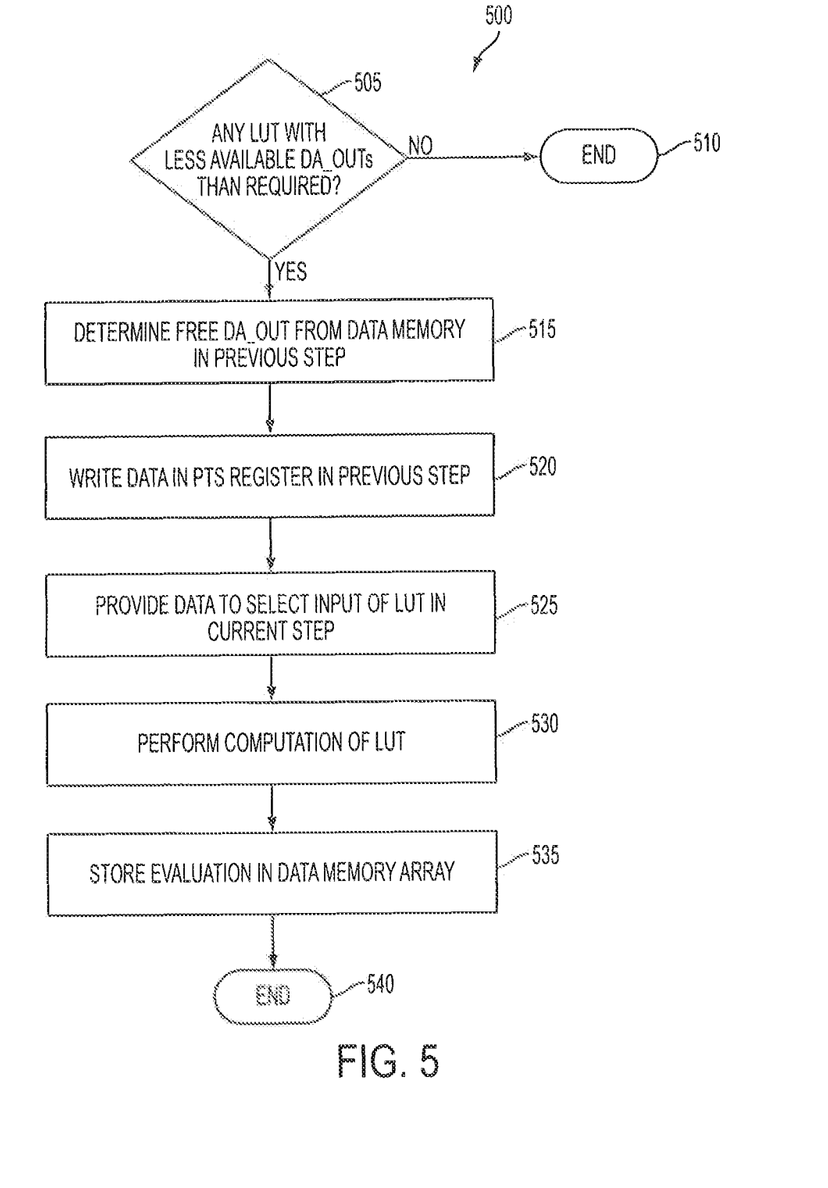
FIG. 5 illustrates a flow diagram of a method of using a port time shift register of a processor cluster during an emulation step according to an exemplary embodiment.

FIG. 5 illustrates a flow diagram of a method 500 of using a port time shift register of a processor cluster during an emulation step according to the exemplary embodiment. In an initial step 505, the method queries whether there are any LUTs of the processor cluster that have less available DA_D-OUTs than required for a particular emulation step in the cycle. If the query is negatively answered, the method ends at step 510. Although not shown, it should be appreciated that this method can be repeated for each step of the emulation process. In other words, once the method ends at step 510, the method is performed again for the next emulation step in the cycle.

If the query at step 505 is affirmatively answered, the method will determine whether there are any available DA_DOUT bits from the memory array that are available in the previous emulation steps of the cycle. The available DA_OUT from the data array memory is identified at step 515 using emulation processor source signal SRC_EP [2:0] to identify the specific emulation processor 300 of the eight emulation processors of the processor cluster 200 and source port signal SRC_PORT [1:0] to identify one of the four data address output values DA_DOUT0 through DA_DOUT3 from the specific data array memories of the identified emulation processor 300.

Next, at step 520, the data from the identified unused read output port is stored in the desired port time shift register 433 as described above with respect to FIG. 4. This is done in a previous step of the emulation cycle. In the next step (i.e., the current step being evaluated by the method) of the method, the data stored in the port time shift register 433 during step 520 is read from the port time shift register 433 and is provided as a select input signal to one of the eight lookup tables 340 of the processor cluster 200 (step 525). It is reiterated that the instructions during method 300 are provided by instruction memory block 210. At step 530, the lookup table 340 execute a Boolean function using the data received from the port time shift register 433 and the resulting evaluation data from the lookup table 340 is stored in the data array memory 330 as described above (step 535). The method ends at step 540 and can be repeated again for the next step of the emulation process.

The emulation unit and method described herein provides the advantage of increasing the efficiency of processor bandwidth by enabling the emulation unit to perform extra lookup table operations during an emulation step where the processor in the emulation unit does not utilize all of the data supplied from a data array memory via the DA_DOUT ports. As should be appreciated, processor bandwidth significantly affect computational efficiency of a hardware emulator. By storing unused data in the port time shift register, the unused data can be used at a later emulation step by a lookup table to perform the extra Boolean operation. Thus, data that is not evaluated by the processor can be utilized at a later time to perform an extra LUT operation.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A processor-based hardware functional verification system into which a circuit design may be mapped, the system comprising:
    a plurality of processors, each processor having a plurality of data inputs and a plurality of select inputs;
    a plurality of electronic memories, each electronic memory having a plurality of read ports;
    at least one time shift register having an input communicatively coupled to the plurality of read ports of the plurality of electronic memories, and an output communicatively coupled to the plurality of select inputs of one of the plurality of processors, respectively; and
    an instruction memory configured to provide a first control signal to the at least one time shift register to store a first amount of data output from one of the plurality of read ports of the plurality of electronic memories.

2. The system of claim 1, wherein each of the plurality of processors is communicatively coupled to each of the plurality of electronic memories, respectively, with the plurality of select inputs respectively coupled to the plurality of read ports of the plurality of electronic memories.

3. The system of claim 1, wherein the instruction memory is further configured to provide instruction words to the plurality of data inputs of the plurality of processors.

4. The system of claim 3, wherein the instruction memory is further configured to provide a second control signal to the at least one time shift register to output the first amount of data via the output.

5. The system of claim 4, further comprising a plurality of multiplexers configured to route the first amount of data output by the at least one time shift register to one of the plurality of select inputs of one of the plurality of processors based on a plurality of control signals provided by the instruction memory to the plurality of multiplexers, respectively.

6. The system of claim 5, wherein the instruction memory is further configured to provide a third control signal to the one of the plurality of processors to perform a Boolean function using the first amount of data.

7. The system of claim 1, further comprising a plurality of multiplexers configured to route the first amount of data from one of the plurality of read ports of the plurality of electronic memories to the at least one time shift register based on a plurality of control signals provided by the instruction memory to the plurality of multiplexers, respectively.

8. An emulation chip into which a portion of a circuit design may be mapped during functional verification, the emulation chip comprising:
    at least one processor having a plurality of data inputs and a plurality of select inputs;
    at least one electronic memory having a plurality of read ports;
    at least one time shift register having an input communicatively coupled to the plurality of read ports and an output communicatively coupled to the plurality of select inputs; and
    an instruction memory configured to provide a first control signal to the at least one time shift register to store a first amount of data output from one of the plurality of read ports.

9. The emulation chip of claim 8, wherein the at least one processors is communicatively coupled to the at least one electronic memory, respectively, with the plurality of select inputs respectively coupled to the plurality of read ports.

10. The emulation chip of claim 8, wherein the instruction memory is further configured to provide instruction words to the plurality of data inputs of the at least one processor.

11. The emulation chip of claim 10, wherein the instruction memory is further configured to provide a second control signal to the at least one time shift register to output the first amount of data via the output.

12. The emulation chip of claim 11, further comprising a plurality of multiplexers configured to route the first amount of data output by the at least one time shift register to one of the plurality of select inputs of the at least one processor based on a plurality of control signals provided by the instruction memory to the plurality of multiplexers, respectively.

13. The emulation chip of claim 12, wherein the instruction memory is further configured to provide a third control signal to the at least one processor to perform a Boolean function using the first amount of data.

14. The emulation chip of claim 8, further comprising a plurality of multiplexers configured to route the first amount of data from one of the plurality of read ports of the at least one electronic memory to the at least one time shift register based on a plurality of control signals provided by the instruction memory to the plurality of multiplexers, respectively.

15. A method for performing a lookup table operation during an emulations step using a time shift register, the method comprising:
   identifying at least one read port of an array memory in a processor cluster that is not being used by a processor during an emulation step;
   storing a first amount of data on the at least one read port in the time shift register;
   providing the first amount of data from the at least one read port in the time shift register to a select input of the processor; and
   performing a Boolean function by the processor using the first amount of data.

16. The method of claim 15, further comprising storing a result of the Boolean function in the array memory.

17. The method of claim 15, further comprising routing the first amount of data from the at least one read port of the array memory to the at least one time shift register by a plurality of multiplexers controlled by a plurality of respective control signals provided by an instruction memory.

18. The method of claim 15, thither routing the first amount of data from the at least one time shift register to the select input of the processor by a plurality of multiplexers based on a plurality of respective control signals provided by an instruction memory.

* * * * *